United States Patent
Usui et al.

(10) Patent No.: US 7,633,191 B2
(45) Date of Patent: Dec. 15, 2009

(54) MULTIPHASE STEP MOTOR

(75) Inventors: Hiroaki Usui, Ueda (JP); Masashi Okubo, Ueda (JP)

(73) Assignee: Shinano Kenshi Kabushiki Kaisha, Ueda-Shi, Nagano (JP)

( * ) Notice: Subject to any disclaimer, the term of this patent is extended or adjusted under 35 U.S.C. 154(b) by 376 days.

(21) Appl. No.: 11/628,655

(22) PCT Filed: Mar. 7, 2006

(86) PCT No.: PCT/JP2006/304312
§ 371 (c)(1),
(2), (4) Date: Dec. 6, 2006

(87) PCT Pub. No.: WO2006/106601
PCT Pub. Date: Oct. 12, 2006

(65) Prior Publication Data
US 2008/0067880 A1   Mar. 20, 2008

(30) Foreign Application Priority Data
Apr. 4, 2005   (JP) .............................. 2005-107849

(51) Int. Cl.
*H02K 37/12*   (2006.01)
*H02K 37/14*   (2006.01)
(52) U.S. Cl. .................. 310/49.34; 310/49.32; 310/257
(58) Field of Classification Search ............... 310/49 R, 310/49 A, 257
See application file for complete search history.

(56) References Cited

U.S. PATENT DOCUMENTS

| | | | | |
|---|---|---|---|---|
| 3,549,918 A | * | 12/1970 | Van Hout et al. .......... | 310/49.17 |
| 3,783,313 A | * | 1/1974 | Mathur ..................... | 310/49.19 |
| 5,177,384 A | * | 1/1993 | Furuki ....................... | 310/49 R |
| 5,410,200 A | * | 4/1995 | Sakamoto et al. ......... | 310/49.32 |
| 5,723,921 A | * | 3/1998 | Sugiura .................... | 310/49.19 |
| 6,031,304 A | * | 2/2000 | Suzuki et al. ............. | 310/49 R |
| 6,060,800 A | * | 5/2000 | Suzuki et al. ............. | 310/49 R |
| 6,323,569 B1 | | 11/2001 | Akama | |
| 6,486,576 B1 | * | 11/2002 | Yura et al. ................ | 310/49 R |
| 6,744,156 B2 | * | 6/2004 | Doi ........................... | 310/49 R |
| 2002/0101120 A1 | * | 8/2002 | Akama et al. ............. | 310/49 R |
| 2002/0180282 A1 | * | 12/2002 | Suzuki et al. ............. | 310/49 R |

FOREIGN PATENT DOCUMENTS

| | | | |
|---|---|---|---|
| JP | 05161335 A | * | 6/1993 |
| JP | 11-55927 A | | 2/1999 |
| JP | 2000-152593 A | | 5/2000 |
| JP | 2001-231240 A | | 8/2001 |
| JP | 2002-204562 A | | 7/2002 |
| JP | 2004289939 A | * | 10/2004 |

* cited by examiner

*Primary Examiner*—Quyen Leung
*Assistant Examiner*—Alex W Mok
(74) *Attorney, Agent, or Firm*—Birch, Stewart, Kolasch & Birch, LLP

(57) ABSTRACT

The multiphase step motor is capable of reducing vibrations of a rotor and torque ripples in spite of switching current flowing through stator coils. Stator units are divided into 2n (n is an integer one or more) per one phase and coaxially layered, and the stator units of the same phase are plane-symmetrically layered with respect to a plane perpendicular to an axial center of a stator.

5 Claims, 7 Drawing Sheets

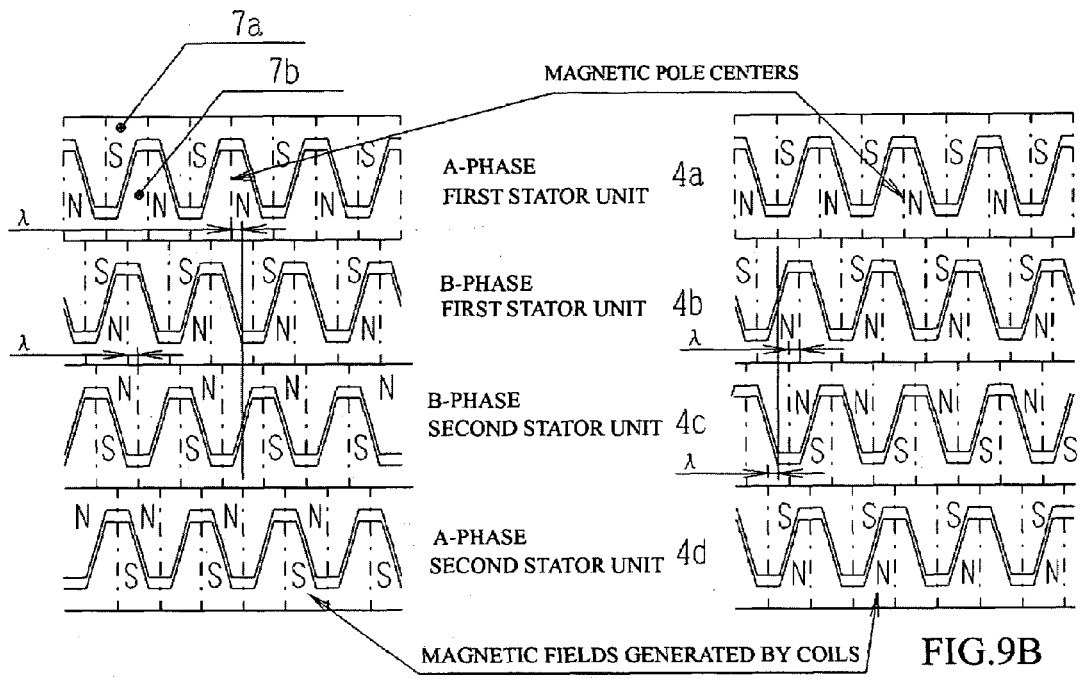
FIG.9A  FIG.9B
FIG.10
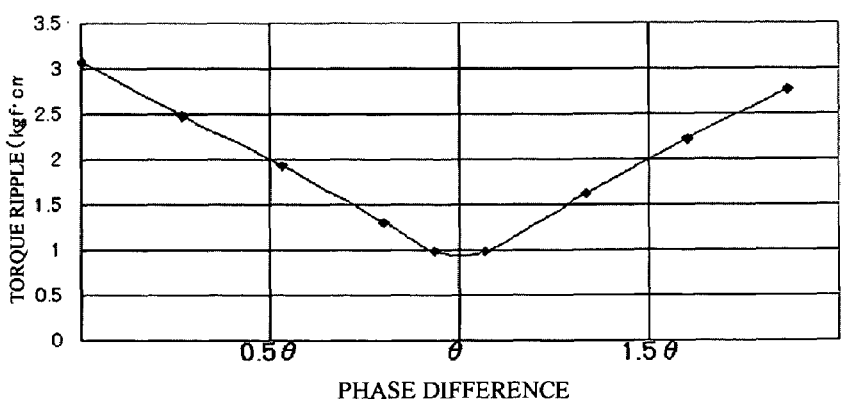

Results of FFT analysis about rotational fluctuations of samples
(layers in the order of the A-phase, B-phase, B-phase and A-phase)

MULTIPHASE STEP MOTOR

FIELD OF TECHNOLOGY

The present invention relates to a multiphase step motor used for, for example, office automation machines, e.g., duplicating machine, peripheral equipments of a computer, e.g., printer, automobiles, conveying machines relating to factory automation.

BACKGROUND TECHNOLOGY

There are various types of (inner rotor type and outer rotor type) multiphase step motors, e.g., PM type motor having a permanent magnet rotor, VR type motor having a gear-shaped iron rotor, hybrid (HB) type motor having a rotor constituted by a gear-shaped iron core and a permanent magnet. The PM type multiphase step motor has a plurality of stator units layered in an axial direction and a permanent magnet rotor, in which N-poles and S-poles are alternately formed and faced the stator units. By switching directions of current flowing through coils of the stator units, stator magnetic poles and rotor magnetic poles mutually attract and repel, so that the rotor can be rotated.

In the multiphase step motor, number of the layered stator units is equal to that of phases. With this structure, when the direction of the current flowing through the phase coil is changed, current values of the stator units are transitionally unbalanced, so that strength of action forces and reaction forces generated between the stator and the rotor are varied and vibration is generated. To reduce torque ripple generated in a rotational direction, a PM type multiphase step motor, in which shaped of adjacent stator magnetic poles are mutually made different (see Patent Document 1), and a PM type multiphase step motor, in which a relationship between positions of stator magnetic poles and a pitch of magnetic poles of a permanent magnet is made different in each of phases to be excited (see Patent Document 2), etc. have been developed. In the above described multiphase step motors, the variation of magnetic flux between the stator magnetic poles and the permanent magnet is smooth.

Patent Document 1: Japanese Patent Gazette No. 2002-204562

Patent Document 2: Japanese Patent Gazette No. 11-55927

DISCLOSURE OF THE INVENTION

In the above described multiphase step motors, when the direction of the current flowing through the phase coil is changed, the current values of the stator units are not same transitionally, so that strength of action forces and reaction forces generated between the stator and the rotor are varied and vibrations are generated. Namely, the vibrations are generated in the axial direction and radial directions of the rotor each time the current direction is changed. Further, In case all magnetic pole centers of the stator units are simultaneously aligned with magnetic pole center of the permanent magnet, magnetic flux density between the stator magnetic poles and the rotor magnetic poles are sharply varied. This action causes torque ripples and generates vibrational components in the circumferential direction.

Variation of attracting forces applied to the rotor of the conventional multiphase step motor will be explained with a schematic view of FIG. 14. Since a force F applied from a stator to an optional position of a rotor 53 (shifted ±x in the axial direction from an axial center of the stator) and the force applied to an inner circumferential face of the rotor are equivalent, the variation will be described as follows.

In this example, a attracting force on an A-phase stator unit 51 side is greater than that on a B-phase stator unit 52. The force F, which is equivalently applied to the rotor 53, is a resultant force of a force F1, which is applied in the axial direction and a force F2, which is applied in the radial direction toward a center of the motor, at a position shifted +x in the axial direction from the axial center of the stator. Next, the current direction is switched, and the attracting force on the B-phase stator unit 52 side is greater than that on the A-phase stator unit 51. In this case, the force F, which is equivalently applied to the rotor 53, is a resultant force of the force F1, which is applied in the axial direction and the force F2, which is applied in the radial direction toward a center of the motor, at a position shifted −x in the axial direction from the axial center of the stator.

Since the rotor 53 is integrally assembled on a rotor shaft not shown, a (fixed) fulcrum point of the rotor 53 exists on the rotor shaft in any of the radial directions. The force applied to the rotor 53 finally works to the fulcrum point as moment. The moment is calculated as (Strength of the force)×(Distance between the fulcrum point to an action point), so the moment is varied by changing the distance even if the force is the same. In the example shown in FIG. 14, the force F1 in the axial direction and the reverse force F1 having the same strength, which are applied to symmetrical positions with respect to a plane P perpendicular to the axial center of the stator, alternately work as the moment working to the fulcrum point of the rotor 53. And the action point of the radial force F2, which is applied to the rotor 53, is alternately changed to the positions shifted +x and −x from the axial center of the stator each time the current direction is changed, so that the moment around the fulcrum point, which is caused by the resultant force F, varies. Vibrations of the rotor 53 are caused by the variation of the moment.

The present invention solves the above described problems, and an object of the present invention is to provide a multiphase step motor capable of reducing vibrations of a rotor and torque ripples caused by switching current flowing through stator coils.

To achieve the object, the present invention has following structures.

The claw-pole type multiphase step motor comprises: a stator having a plurality of stator units, which are coaxially layered and in each of which an coil is sandwiched by stator yokes and claw poles of the stator yokes are mutually engaged; and a rotor having a permanent magnet, whose magnetic poles are formed to face the claw poles of the stator yokes, and the stator units are divided into 2n (n is an integer one or more) per one phase and coaxially layered, and the stator units of the same phase are plane-symmetrically layered with respect to a plane perpendicular to an axial center of the stator.

In the multiphase step motor, phase difference λ is made between magnetic pole centers of the stator units, which are excited as the same phase, so as not to simultaneously aligned all magnetic pole centers with magnetic pole centers of the rotor.

In the multiphase step motor, two pieces of stator unit are excited as the same phase, the phase difference of the stator units excited as the same phase is λ, a value θ is defined by the formula: θ=360 degrees/{[(number of the magnetic poles of the permanent magnet)/2]×4×(number of the stator units in the same phase)}, the phase difference λ is designed as 0.5×θ≦λ≦1.5×θ.

EFFECTS OF THE INVENTION

In the above described multiphase step motor, 2n (n is the integer one or more) pieces of the stator unit per one phase are coaxially layered, and the stator units of the same phase are plane-symmetrically layered with respect to the plane perpendicular to the axial center of the stator, therefore when switching the direction of current in the same phase coils, an action point of the force equivalent to component forces in the axial direction and the radial direction, which works to the rotor, is fixed so that vibrations of the rotor, which are caused by variation of moment, can be prevented.

When the current flow is switched from the coils of one phase to the coils of another phase, an even number of magnetic poles on the craw poles, in the plane perpendicular to a motor shaft, of each phase stator unit excited by the current are generated. In the invention, an even number of the stator units of the same phase are layered, and the phase difference $\lambda$ is made between the magnetic pole centers of the stator units. With this structure, the variation of the spatial distribution of the magnetic flux in circumferential direction emitted from the magnetic poles is smooth because the magnetic pole centers of the layered stator units in the same phase do not align with the magnetic pole centers of the rotor. Therefore, sharp variation of the rotor torque can be restricted, torque ripples can be reduced, and vibrations can be reduced.

BRIEF DESCRIPTION OF THE DRAWINGS

FIGS. 9A and 9B are explanation views showing phase differences between magnetic pole centers of A-phase stator units and B-phase stator units;

FIG. 10 is a graph showing a relationship between the phase differences and torque ripples;

PREFERRED EMBODIMENTS OF THE INVENTION

Preferred embodiments of the present invention will now be described in detail with reference to the accompanying drawings. The present invention is applied to a claw-pole type multiphase step motor comprising: a stator having a plurality of stator units, which are coaxially layered and in each of which an coil is sandwiched by stator yokes and claw poles of the stator yokes are mutually engaged; and a rotor having a permanent magnet, whose magnetic poles are formed to face the claw poles of the stator yokes. In the present embodiment, the multiphase step motor is an outer rotor type multiphase step motor, which is used for, example, office automation machines, e.g., duplicating machine, peripheral equipments of a computer, e.g., printer, automobiles, conveying machines relating to factory automation.

Figure 1:
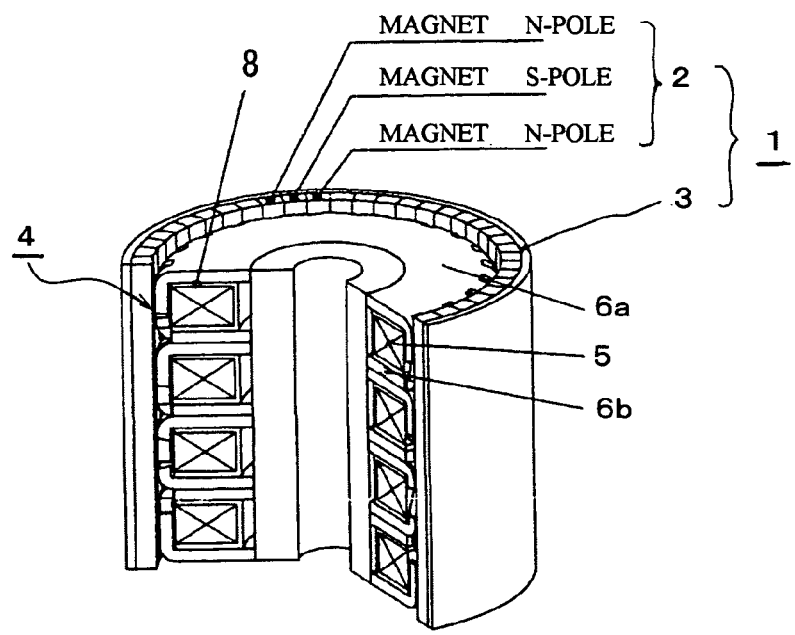
FIG. 1 is a partially cut away perspective view of a rotor and a stator of a two-phase step motor.

An outline of the multiphase step motor will be explained with reference to FIG. 1. In FIG. 1, permanent magnet 2, which are alternately magnetized as N-poles and S-poles, are fitted into an inner circumferential face of a rotor yoke 3. The permanent magnet 2 faces claw poles of a stator, which will be described later. The rotor 1 is fixed on a rotor shaft (rotary shaft), not shown, and held thereon.

Figure 2:
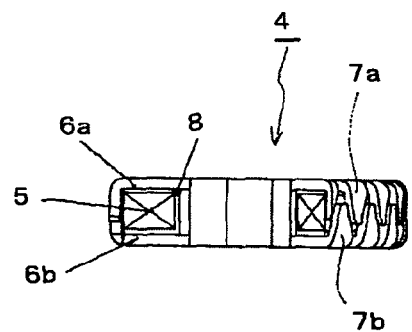
FIG. 2 is a half sectional view of a stator unit.

In FIG. 2, the stator 4 is constituted by coil 5 wound on a bobbin 8 and an upper and lower stator yokes 6a and 6b made of a magnetic material which sandwich the coil and the claw poles 7a and 7b, which are formed like comb teeth, are mutually engaged. The upper and lower stator yokes 6a and 6b are fixed on a housing, not shown, in which bearings for rotatably holding the rotor shaft are fitted.

Figure 4:
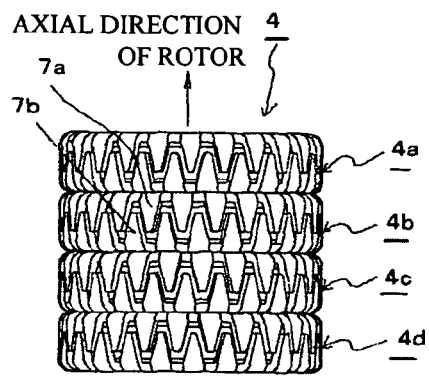
FIG. 4 is a front view of the layered stator units.
Figure 5:
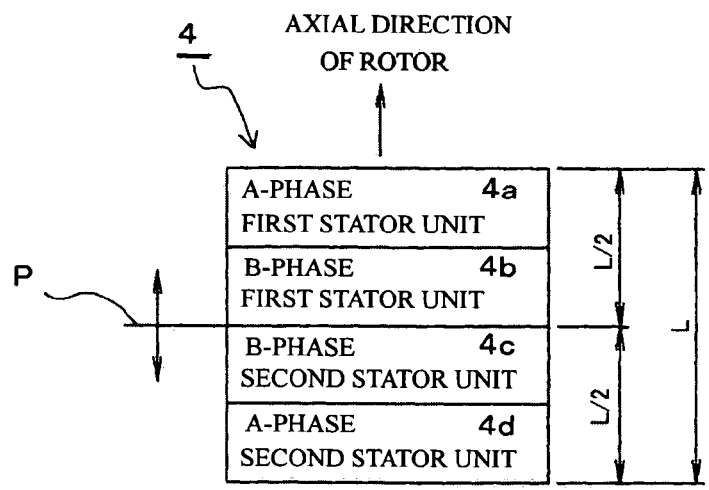
FIG. 5 is a schematic view of the two-phase step motor.

In FIG. 1, the stator 4 is constituted by a plurality stator units, which are divided into 2n (n is an integer one or more) per one phase and coaxially layered. In the present embodiment, as shown in FIG. 5, first stator units 4a and 4b (an A-phase and a B-phase) and second stator units 4c and 4d (the B-phase and the A-phase) are provided, so four of the stator units are coaxially layered (see FIG. 4). The stator units 4a and 4d of the same phase (the A-phase) and the stator units 4b and 4c of the same phase (the B-phase) are plane-symmetrically layered with respect to a plane P perpendicular to an axial center of the stator 4 (a height of the stator 4 is L; a level of the plane P is L/2). In FIG. 5, the stator units 4a-4d are layered in the order of the A-phase, B-phase, B-phase and A-phase.

Figure 3:
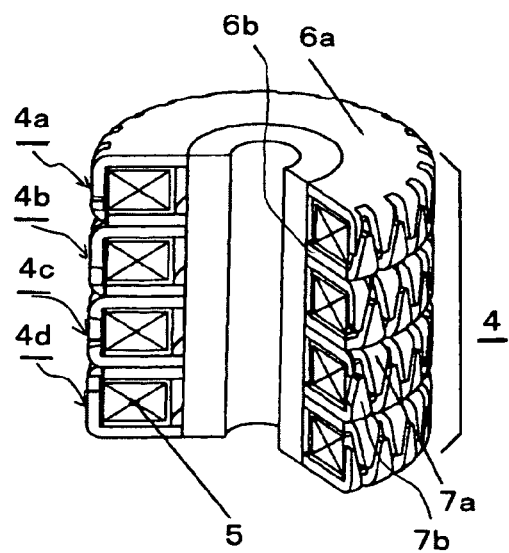
FIG. 3 is a partially cut away perspective view of the layered stator units.
Figure 6:
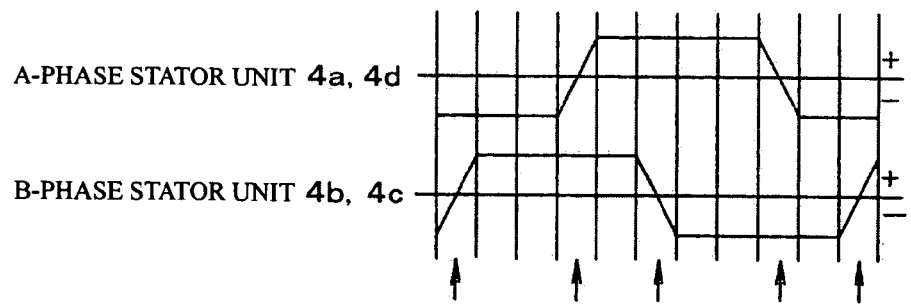
FIG. 6 is an explanation view of the two-phase step motor when the directions of the currents are changed.

In FIG. 3, the stator yokes 6a and 6b of the A- and B-phases are coaxially fixed, and an even number of the stator magnetic poles are alternately formed, i.e., formed as N, S, N, S, in the plane perpendicular to rotor shaft by feeding the current to the coils 5. The coils 5 in the stator units of the same phase, the coils in the stator units 4a and 4b of the A phase and the coils in the stator units 4b and 4c of the B phase, are electrically connected in series or in parallel. In the A-phase coils or the B-phase coils, magnetically unbalanced statuses occur each time a direction of a current is switched or changed at timings indicated by arrows shown in FIG. 6.

Figure 7A:
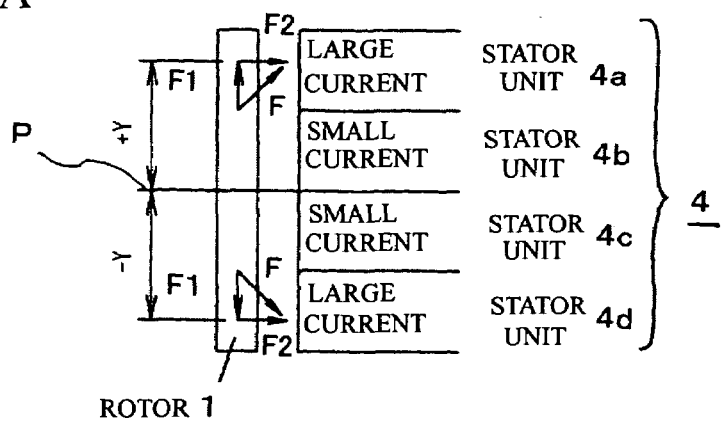
FIGS. 7A and 7B are explanation views of forces equivalently applied to the rotor.

In FIG. 7A, when the direction of the current, which flows through the A-phase coils or the B-phase coils of the first stator units 4a and 4b and the second stator units 4c an 4d, is switched, a attracting force of the A-phase stator units 4a and 4d (the A-phase) is, for example, made greater than that of the B-phase stator units 4b and 4c (the B-phase) by unbalance of the current intensity. A force F, which equivalently works from the stator to the rotor 1, is a resultant force of a force F1, which works in the axial direction, and a force F2, which radially works toward a center of the motor, at a position, for example, axially shifted +Y from an axial center of the stator 4. At that time, a reverse force F1 having the same strength works to the rotor 1 at a symmetrical position with respect to the plane P perpendicular to the axial center of the stator, so only the force F2, which radially works toward the center of the motor, works to the rotor 1.

Figure 7B:
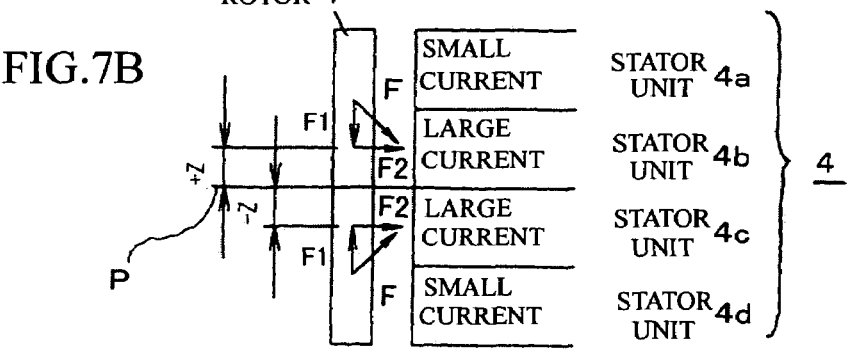

In FIG. 7B, when the attracting force of the B-phase stator units 4b and 4c is greater than that of the A-phase stator units 4a and 4d, the force F, which equivalently works from the stator to the rotor 1, is a resultant force of a force F1, which works in the axial direction, and a force F2, which radially works toward the center of the motor, at a position, for example, axially shifted +Z from the axial center of the stator 4. At that time, the reverse force F1 having the same strength works to the rotor 1 at a symmetrical position with respect to the plane P perpendicular to the axial center of the stator, so only the force F2, which radially works toward the center of the motor, works to the rotor 1.

Namely, when the current direction is changed in the A-phase stator units 4a and 4d and the B-phase stator units 4b and 4c, the axial force F1 working to the rotor 1 is canceled by the reverse force; if the moment, which is caused by the force F2 radially working toward the center of the motor, is not varied when the current direction is changed, no vibrations are generated in the rotor 1.

The moment is calculated as (Strength of the force)×(Distance between the fulcrum point to an action point), so the moment is not varied if the distance between the fulcrum point and the action point is fixed.

Figure 8:
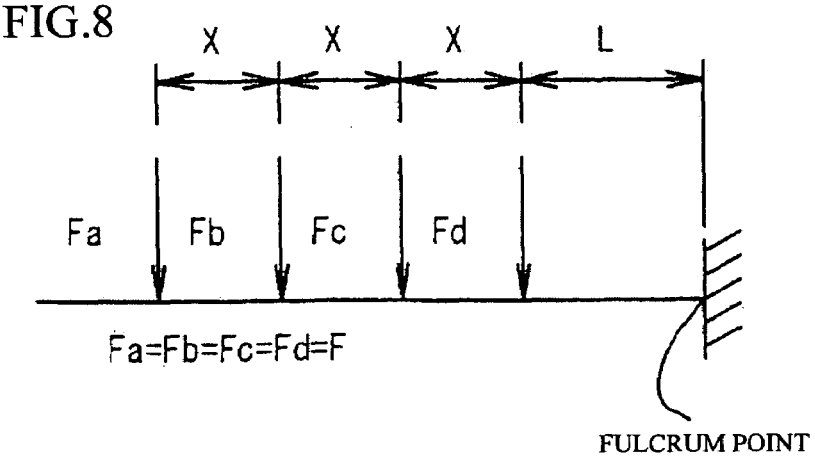
FIG. 8 is an explanation view of moments equivalently working to the rotor.

In FIG. 8, Fa and Fb are assumed as forces equivalently work toward the radial centers of the first stator units 4a and 4b, and Fc and Fd are assumed as forces equivalently work toward the radial centers of the second stator units 4c and 4d. The forces Fa, Fb, Fc and Fd which radially attract the rotor 1 are equal in intensity, Fa=Fb=Fc=Fd, when the electric power is supplied to the coils 5; if shapes of the stator units, winding numbers of magnet wires and current intensities of the coils 5 are same. When the current intensities of the coils 5 are unbalanced, one of the attracting force of the A-phase stator units 4a and 4d and the attracting force of the B-phase stator units 4b and 4c is greater than the other. If the smaller force of the attracting forces of the A-phase and the B-phase can be ignored, the moment Tad around the fulcrum point, which works to the rotor 1, is expressed as Tad=3FX+2FL (wherein L is a distance from the fulcrum point to the nearest stator unit, and X is a distance between the adjacent stator units) when the attracting force of the A-phase stator units 4a and 4d is greater than that of the B-phase; the same moment Tad=3FX+2FL works to the rotor 1 when the attracting force of the B-phase stator units 4b and 4c is greater than that of the A-phase. Namely, when the current direction is changed in either phase stator units, the A-phase stator units 4a and 4d or the B-phase stator units 4b and 4c, the moment, which is caused by the force F2 radially working toward the center of the motor, is not varied so that no vibrations are generated in the rotor 1.

A prescribed phase difference is made between the stator units 4a and 4d in the same phases (the A-phase) and between the stator units 4b and 4c in the same phase (the B-phase). For example, in FIGS. 9A and 9B, the phase difference λ is made between the A-phase stator units 4a and 4d and between the B-phase stator units 4b and 4c, where the stator units in the same phase are excited together by feeding the electric power.

Namely, in the A-phase stator units 4a and 4d and the B-phase stator units 4b and 4c, they are layered with forming the phase difference λ so as not to simultaneously align magnetic pole centers of the claw poles 7a and 7b with those of the permanent magnet 2 of the rotor 1. With this structure, the magnetic pole centers of the stator units in the same phase, the magnetic pole centers of 4a and 4d and those of the stator units 4b and 4c, are not simultaneously aligned to the magnetic pole centers of the permanent magnet 2, so that magnetic flux can be varied smoothly. Therefore, sharp torque variation of the rotor 1 can be restrained and torque ripples can be reduced, so that vibrations can be reduced.

A concrete example of a two-phase step motor will be explained with reference to FIGS. 9A and 9B.

A relationship between the phase difference λ between the magnetic pole centers of the stator units, which are excited as the same phase, and torque ripples is shown in FIG. 10. A value θ is defined by the formula: θ=360 degrees/{[(number of the magnetic poles of the permanent magnet)/2]×4×(number of the stator units in the same phase)}. For example, in case that the number of the stator units excited in the same phase is two (the A-phase and the B-phase) and the number of the magnetic poles of the permanent magnet 2 is 48, the value θ=1.875 degrees. By selecting the optimum phase difference λ from the graph, magnetic flux can be varied smoothly and torque ripples can be reduced. For example, the optimum phase difference λ is defined as 0.5×θ≦λ≦1.5×θ so as to reduce the torque ripples to about 2 kgf·cm or less.

Figure 15:
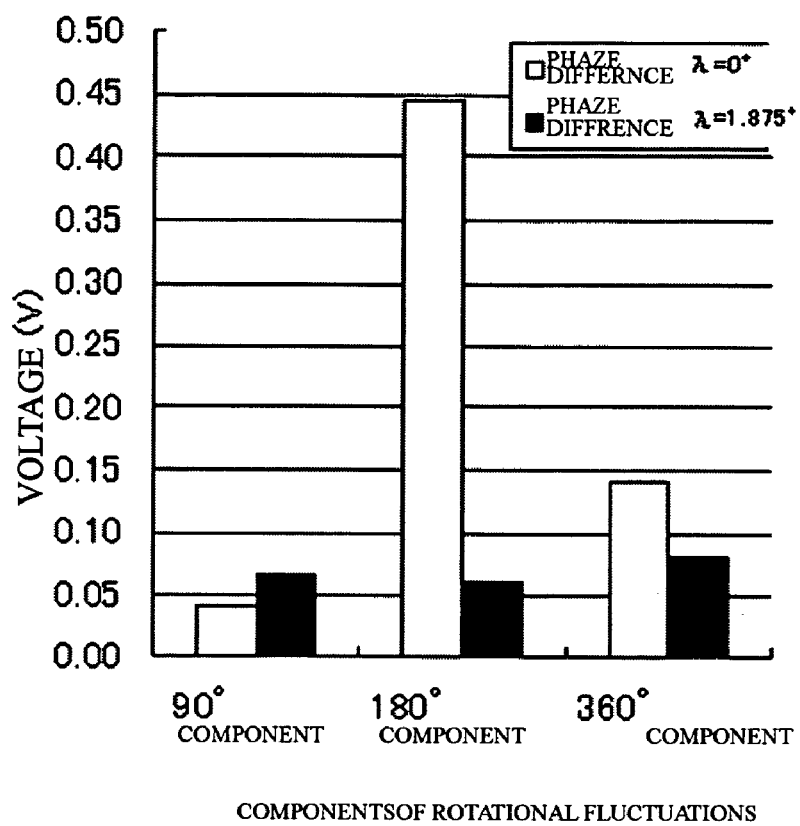
FIG. 15 is a comparative graph showing rotational fluctuations wherein $\lambda=0$ and $\lambda=\theta$.

Results of waveform analysis about rotational fluctuations of samples, one of which had the optimum phase difference (λ=1.875°) and the other of which had no phase difference (λ=0°), are shown in FIG. 15. The waveform analysis (FFT analysis) was performed so as to frequency-analyze components of rotational fluctuations; in comparison with the other sample having no phase difference λ, a component 180° of the one sample, which had the phase difference λ between the magnetic pole centers of the A-phase and the B-phase, was highly reduced. The rotational fluctuations cause vibrations, so they should be reduced as much as possible. Especially, the component 180° is a component generated by a cogging torque of the motor, so we found that the cogging torque could be reduced by setting the optimum phase difference λ.

Figure 11B:
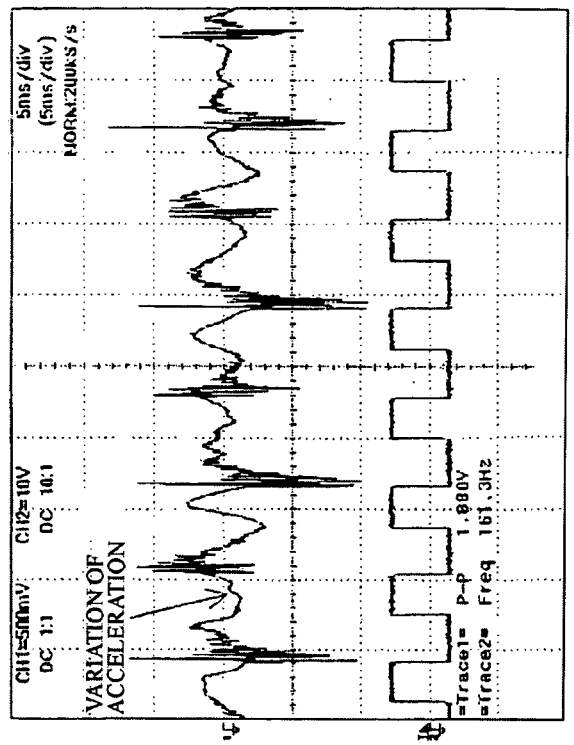
FIGS. 11A and 11B are graphs of vibrations generated in the motor of the present invention and the conventional motor.
Figure 11A:
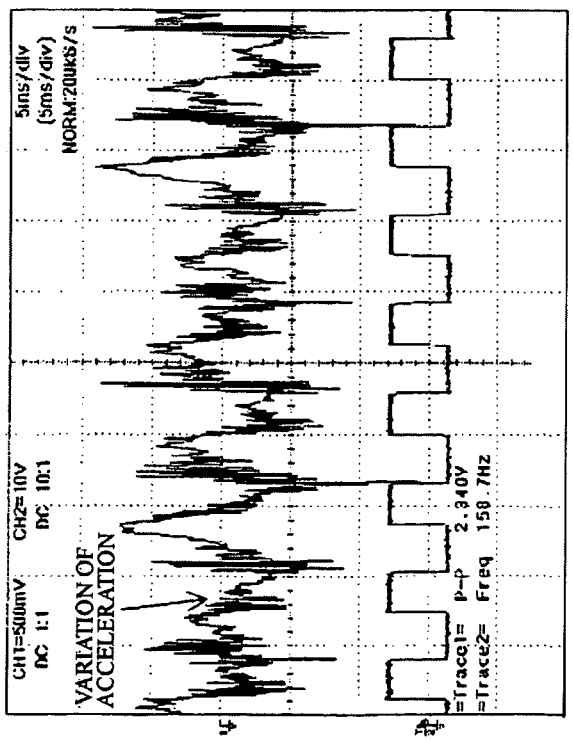
Figure 12:
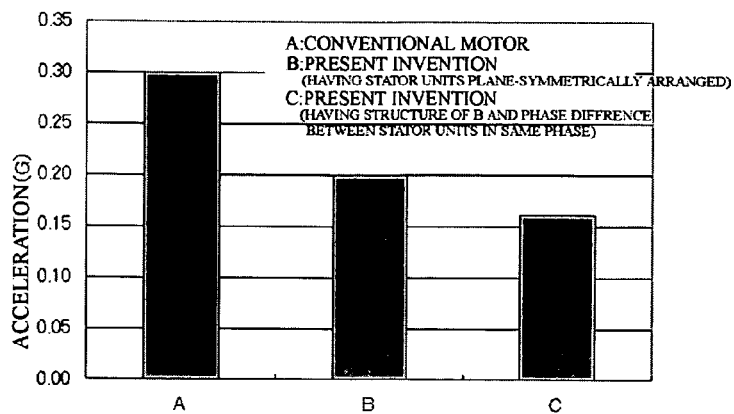
FIG. 12 is a comparative graph showing variations of acceleration.

According to graphs of FIGS. 11A, 11B and 12, vibrations of the two-phase step motor could be reduced. FIGS. 11A and 11B are graphs of variations of vibrations, which were measured by an accelerometer attached to end faces of cylindrical sections of sample motors. The sample of FIG. 11A was the conventional motor (see the structure of the two-phase step motor shown in FIG. 13); the sample of FIG. 11B was the two-phase step motor of the present embodiment. In comparison with the sample having the conventional structure, amplitudes of waveforms of the present embodiment were smaller and small pitch variations of acceleration were reduced. We think that the variations of acceleration of the rotor indicates variations of vibrations (∴ angular acceleration is in proportion to the number of vibration frequency), so the vibrations were made small.

A comparative graph of acceleration data of samples is shown in FIG. 12. In the graph, a sample A was the conventional two-phase step motor; a sample B was the two-phase step motor, in which the stator units in the same phase were plane-symmetrically arranged; and a sample C was the two-phase step motor, which had the structure of the sample B and further had the phase difference λ between the stator units in the same phase. According to the graph, in the case that the stator units 4a and 4d in the same phase (the A-phase) and the stator units 4b and 4c in the same phase (the B-phase) were plane-symmetrically arranged and the phase differences λ were set in the stator units 4a and 4d in the same phase (the A-phase) and the stator units 4b and 4c in the same phase (the B-phase), the vibrations were minimized (see C of the graph).

Figure 13:
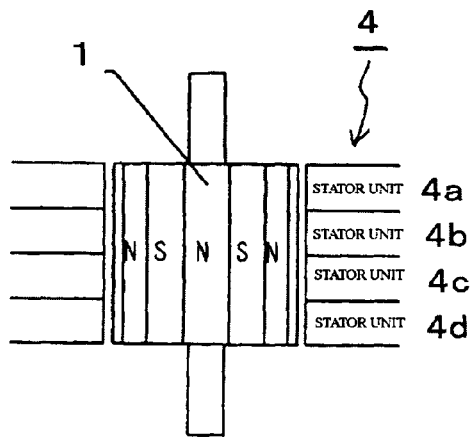
FIG. 13 is an explanation view of an inner rotor-type multiphase step motor.
Figure 14:
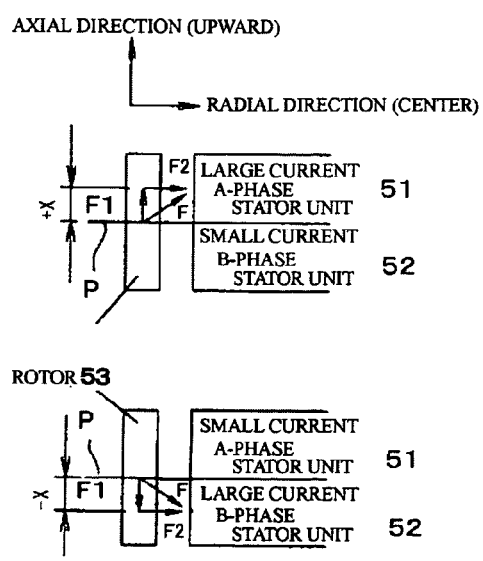
FIG. 14 is a schematic view of the conventional multiphase stem motor.

In the above described embodiment, the multiphase step motor is the outer rotor type motor, but the present invention can be applied to the inner rotor type multiphase step motor shown in FIG. 13, in which the rotor 1 is enclosed by the stator 4. Namely, the magnetic poles of the rotor 1, which are formed on an outer circumferential face, face with the claw poles 7a and 7b, which are formed on an inner circumferential face side of each of the stator units 4a, 4b, 4c and 4d.

The present invention may be applied for a full-step drive motor, in which a rotor is turned one step angle by one pulse, and further applied for a micro-step drive motor, in which turning resolution is highly increased and vibrations can be highly reduced as a synergy effect.

In the above described embodiment, the two-phase step motor is explained as the multiphase step motor, but the present invention is not limited to the embodiment, so the present invention may be applied to three-phase, four-phase, . . . n-phase step motors, in each of which the axial length is long but vibrations can be reduced.

The invention claimed is:

1. A claw-pole type multiphase step motor, comprising:
    a stator having a plurality of stator units, each stator unit including a coil that is sandwiched by stator yokes and mutually engaged stator yoke claw poles; and
    a rotor having a permanent magnet, whose magnetic poles are formed to face the claw poles of the stator yokes,
    wherein the claw-pole type multiphase step motor is configured to operate in accordance with a plurality of phases,
    wherein the plurality of stator units are coaxially layered and include 2n (n is an integer one or more) stator units per each phase of the plurality of phases, and
    wherein the 2n stator units per each of the plurality of phases are plane-symmetrically layered with respect to a plane perpendicular to an axial center of said stator.

2. The multiphase step motor according to claim 1, wherein a phase difference $\lambda$ is made between magnetic pole centers of the stator units, which are excited as the same phase by electric power distribution, so as not to simultaneously align with magnetic pole centers of said rotor.

3. The multiphase step motor according to claim 2, wherein the stator units excited as the same phase have two phases, the phase difference of the stator units excited as the same phase is $\lambda$, a value $\theta$ is defined by the formula: $\theta=360$ degrees/$\{$[(number of the magnetic poles of the permanent magnet)/2]$\times 4\times$(number of the stator units in the same phase)$\}$, and the phase difference $\lambda$ is defined as $0.5\times\theta \leq \lambda \leq 1.5\times\theta$.

4. The multiphase step motor according to claim 1,
    wherein forces in an axial direction of the rotor, which are generated by attracting forces of the phases of the rotor, have a common intensity and work to an intermediate plane from opposite directions, and
    wherein a moment around a fulcrum point, which is caused by equivalent forces in the radial direction, is not varied.

5. The multiphase step motor according to claim 1,
    wherein the plurality of phases include a first phase (phase A) and a second phase (phase B), and
    wherein the 2n stator units that are plane-symmetrically layered with respect to the plane perpendicular to the axial center include 2 stator units per each of the first and second phases to form a stator phase pattern of A-B-B-A.

* * * * *